United States Patent [19]

Nishimura

[11] Patent Number: 5,483,438
[45] Date of Patent: Jan. 9, 1996

[54] NOISE REDUCING ESTIMATOR

[75] Inventor: Tomoyuki Nishimura, Tokyo, Japan

[73] Assignee: NEC Corporation, Tokyo, Japan

[21] Appl. No.: 863,779

[22] Filed: Apr. 6, 1992

[30] Foreign Application Priority Data

Apr. 5, 1991 [JP] Japan ................................. 3-099681

[51] Int. Cl.$^6$ ............................ G05B 13/00; G11B 21/00
[52] U.S. Cl. ............................. 364/149; 364/176; 360/75
[58] Field of Search ................................. 364/149, 150, 364/151, 157, 164, 165, 174, 175, 176; 360/75, 77.01, 77.02, 77.03

[56] References Cited

U.S. PATENT DOCUMENTS

| | | | |
|---|---|---|---|
| 3,767,900 | 10/1973 | Chao et al. | 364/164 X |
| 4,054,780 | 10/1977 | Bartley et al. | 364/150 |
| 4,766,967 | 8/1988 | Slicker et al. | 180/54.1 |
| 4,769,766 | 7/1988 | Tung | 364/157 X |
| 4,882,526 | 11/1989 | Iino | 364/150 X |
| 4,904,915 | 2/1990 | Kurakake | 364/174 X |
| 5,034,312 | 7/1991 | Saito | 364/149 X |
| 5,041,927 | 8/1991 | Maruyama | 360/77.02 |
| 5,095,471 | 3/1992 | Sidman | 369/43 |
| 5,132,897 | 7/1992 | Allenberg | 364/165 X |
| 5,166,873 | 11/1992 | Takatsu et al. | 364/151 |
| 5,189,571 | 2/1993 | Murphy et al. | 360/75 |
| 5,206,570 | 4/1993 | Hargarten et al. | 360/77.02 |

OTHER PUBLICATIONS

Gene F. Franklin et al., "Digital Control of Dynamic Systems", 2nd ed., Chapter 6.3, pp. 230–264.

*Primary Examiner*—Roy N. Envall, Jr.
*Assistant Examiner*—Brian C. Oakes
*Attorney, Agent, or Firm*—Foley & Lardner

[57] ABSTRACT

An estimator for reducing noise is disclosed. The estimator receives an input signal from controllably driven mechanical parts (the "plant"), estimates an internal physical quantity in the plant and outputs a first estimated physical quantity. A low frequency filter receives a detection signal from the plant. Another estimator receives the low frequency detection signal and outputs a second estimated physical quantity. A mixer receives the first and second estimated physical quantities and outputs a third estimated physical quantity.

10 Claims, 11 Drawing Sheets

NOISE REDUCING ESTIMATOR

BACKGROUND OF THE INVENTION

In many instances of the manufacturing of electronic apparatuses, the mechanical aspects of manufacturing are automatically controlled. Especially in recent years, such automatic controls are required to be extremely precise. In magnetic disk apparatuses and optical disk apparatuses for instance, the positioning of their heads used for the recording and reproduction of information calls for a very high level of accuracy because the track pitch is reduced to increase the storage capacity.

In such an electronic apparatus, a controller is provided to regulate its mechanical operations, and this controller generates electric power to drive the mechanical parts (hereinafter collectively referred to as the "plant"). The role of the controller generally is to keep physical quantities (the travelling speed of the arm, for example) at their respectively set values. Therefore, in order to ensure the accuracy of control, the physical quantities of the plant should be monitored. If the physical quantities to be controlled in the plant could be directly monitored and fed back to the plant by electric signals or the like, there would be no problem, but such monitoring usually is difficult, and in many cases the physical quantities can be detected only indirectly through sensors or the like. For this reason, an estimator is used to estimate which cannot be directly detected physical quantities in the plant. General consideration of such an estimator is described in Gene F. Franklin et al., Digital Control of Dynamic Systems, 2nd ed., Chapter 6.3, pp. 250–264. One of the examples of the use of an estimator in a specific plant is disclosed in the U.S. Pat. No. 4,766,967, where the estimator is used in a motor vehicle.

In detecting physical quantities from information detected by an estimator, however, the physical quantities cannot be accurately estimated if the detected information contains noise irrelevant to them. An object of the present invention is to provide an estimator which can restrain the impact of such noise.

SUMMARY OF THE INVENTION

According to a first aspect of the present invention, there is provided an estimator, into which an input signal of the plant is entered, for estimating an internal physical quantity in the plant and supplying a first estimated physical quantity. A generator, into which a detection signal supplied from the plant is entered, generates a low frequency detection signal by attenuating the high frequency component of this detection signal. Means into which this low frequency detection signal is entered, estimates the internal physical quantity in the plant from this low frequency detection signal and supplies a second estimated physical quantity. Mixing means, into which the first and second estimated physical quantities are entered, generate a third estimated physical quantity.

According to a second aspect of the invention, there is provided an estimator comprising means, into which a detection signal supplied from the plant is entered, for generating a low frequency detection signal by attenuating the high frequency component of this detection signal; and means, into which an input signal of the plant and the low frequency detection signal are entered, for estimating an internal physical quantity in the plant and supplying an estimated physical quantity.

Further, according to a third aspect of the invention, there is provided an estimator comprising a first estimating means, into which an input signal of the plant and a detection signal supplied from the plant are entered, for estimating an internal physical quantity in the plant and supplying a first estimated physical quantity; and attenuating means, into which the first estimated physical quantity is entered, for attenuating the high frequency component contained in this first estimated physical quantity and supplying a second estimated physical quantity, wherein this attenuating means, composed equivalently to at least a part of the first estimating means, is second estimating means, into which the input signal of said plant and the first estimated physical quantity are entered, for supplying a second physical quantity.

DETAILED DESCRIPTION OF THE PREFERRED EMBODIMENTS

Figure 1:
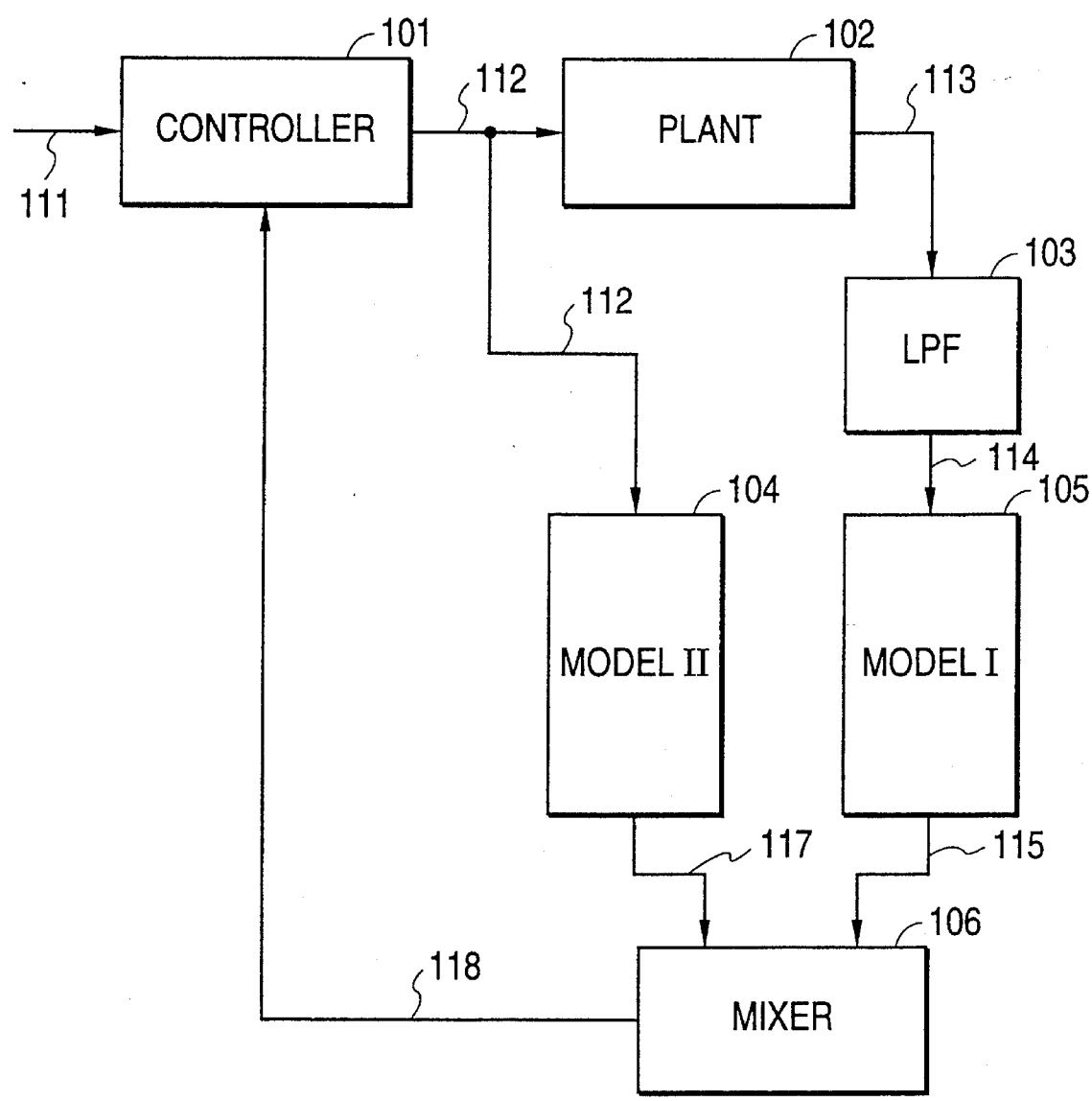
FIG. 1 is a block diagram illustrating a first preferred embodiment of the present invention.

FIG. 1 illustrates a first preferred embodiment of the present invention. A controller 101, into which a set input 111 is entered, supplies a plant 102 with a control signal 112 for controlling an internal physical quantity in the plant 102. To perform this control, the controller 101 receives the input of an estimated physical quantity 118 virtually representing the internal physical quantity in the plant 102. When, for instance, the set input 111 indicates the intended value of an internal physical quantity in the plant 102, the controller 101 supplies, on the basis of the difference between the intended value and the estimated physical quantity, the control signal 112 to the plant 102 so as to eliminate this difference.

A model II 104 equivalently processes the control signal 112 until it becomes a physical quantity in the plant 102, and supplies a signal 117 indicating the physical quantity. Thus, the signal 117 indicates the physical quantity which is expected to be the internal physical quantity output from the plant 102 when the control signal 112 is entered into it.

Meanwhile, a signal 113, which results from indirect detection of the physical quantity in the plant 102, is entered into a low-pass filter (LPF) 103. The LPF 103 cuts the high frequency region of the signal 113, and supplies a signal 114. A model I 105 equivalently processes, in the reverse direction, the pertinent physical quantity until it becomes the detection signal 113 in the plant 102. Thus the model I 105, receiving the input of the detection signal 113 (114), foresees the pertinent internal physical quantity to be a given value according to the detection signal 114, and supplies a signal 115 indicating that foreseen value of the physical quantity. Here, the high frequency region cut by the LPF 103 is attributable to detection noise. Therefore, this high frequency region, which would not only be unnecessary but even harmful for the prediction of the physical quantity in the model I 105, is cut in advance.

The signal 117 indicating the physical quantity predicted from the control 112 and the signal 115 indicating the physical quantity predicted from the detection signal 113 are entered into a mixer 106, and only the more reliable parts of the two signals 117 and 115 are combined and supplied as an estimated physical quantity 118.

Figure 2:
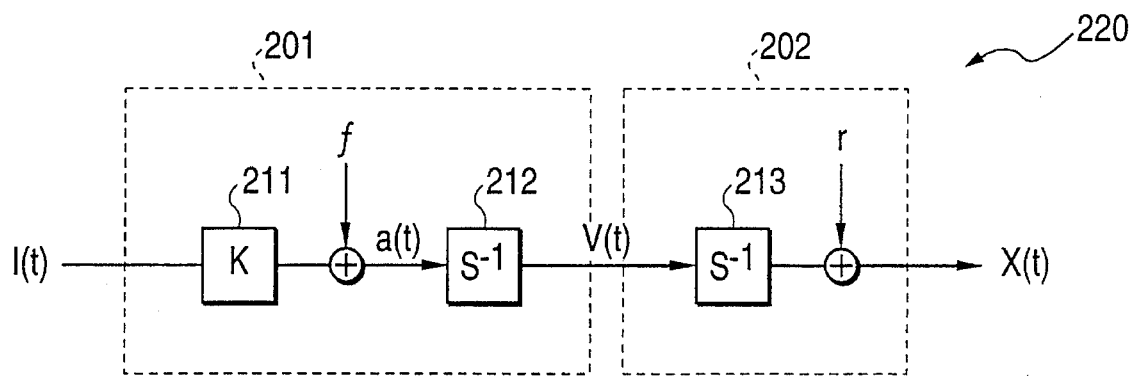
FIG. 2 is a block diagram equivalent illustrating the plant shown in FIG. 3.

This first preferred embodiment of the invention will now be described in more specific terms. First, a specific example of plant is referred to. A plant 220 illustrated in FIG. 2 represents the magnetic head drive mechanism of the magnetic disk apparatus shown in FIG. 3.

Figure 3:
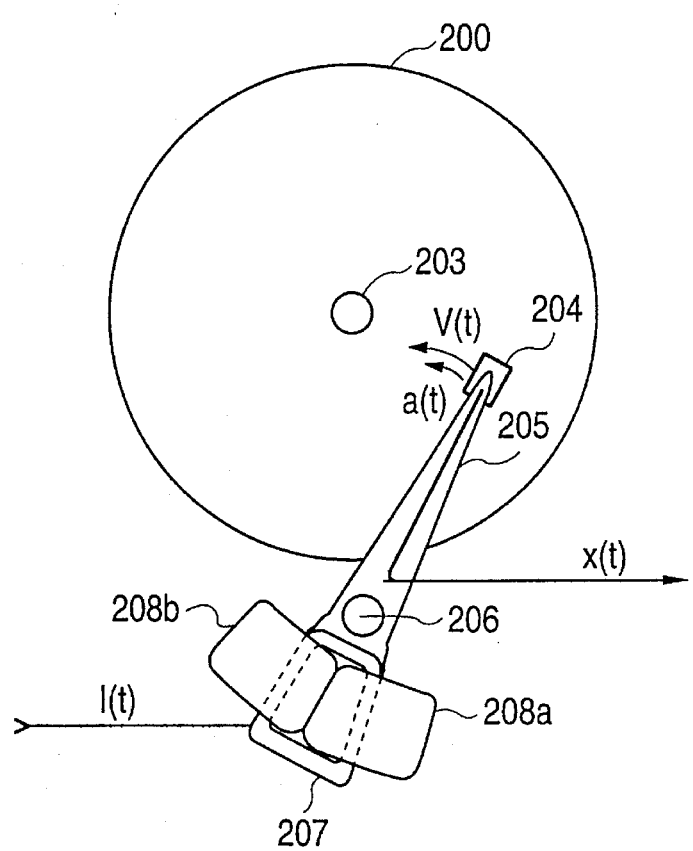
FIG. 3 is a schematic diagram illustrating a specific example of the plant.

As shown in FIG. 3, in a magnetic disk apparatus, a magnetic head 204 is moved and set in a prescribed position on a magnetic disk 200 rotating around a rotary shaft 203. The magnetic head 204 is fixed to an arm 205, which rotates around a shaft 206. At the other end of the arm 205 is formed a coil 207, which is placed between magnetic circuits 208a and 208b. The magnetic circuits 208a and 208b provide magnetic fields, reverse in direction to each other, to the coil 207. By letting an electric current flow through the coil 207, forces in the same direction are generated on the coil 207 in the two magnetic fields, and the magnetic head 204 moves, revolving around the shift 206.

The magnetic head 204 is fitted with an electromagnetic converter element (not shown), which converts the information magnetically recorded on the disk 200 into an electric signal. In this particular example, the information recorded on the disk 200 indicates the position of the magnetic disk 204 on the disk 200. Therefore, the position of the magnetic head 204 on the disk can be identified from the electric signal obtained from the magnetic head 204.

In this magnetic head drive mechanism, a current I(t) flows through the coil 207 as a control signal. The current I(t) manifests itself as the acceleration a(t) of the magnetic head 204. The magnetic head 204, subjected to the acceleration a(t), moves at a velocity V(t). From this magnetic head 204 is supplied information X(t), indicating its position, in an electric signal.

The operation of this magnetic head drive mechanism is equivalently illustrated in FIG. 2 in a block diagram form. The current I(t) and the acceleration a(t) are in a directly proportional relationship. Therefore, the acceleration a(t) is obtained by multiplying the current I(t) by a constant K in a block 211. The acceleration a(t) is integrated in a block 212 to give the velocity V(t), which in turn is integrated in a block 213 to give the position X(t). In addition to these blocks, disturbance f under the influence of gravity and the like works as an acceleration, and noise r at the time of reproducing the positional information also joins the positional information. These f and r are unpredictable at the time of designing the apparatus.

Figure 4A:
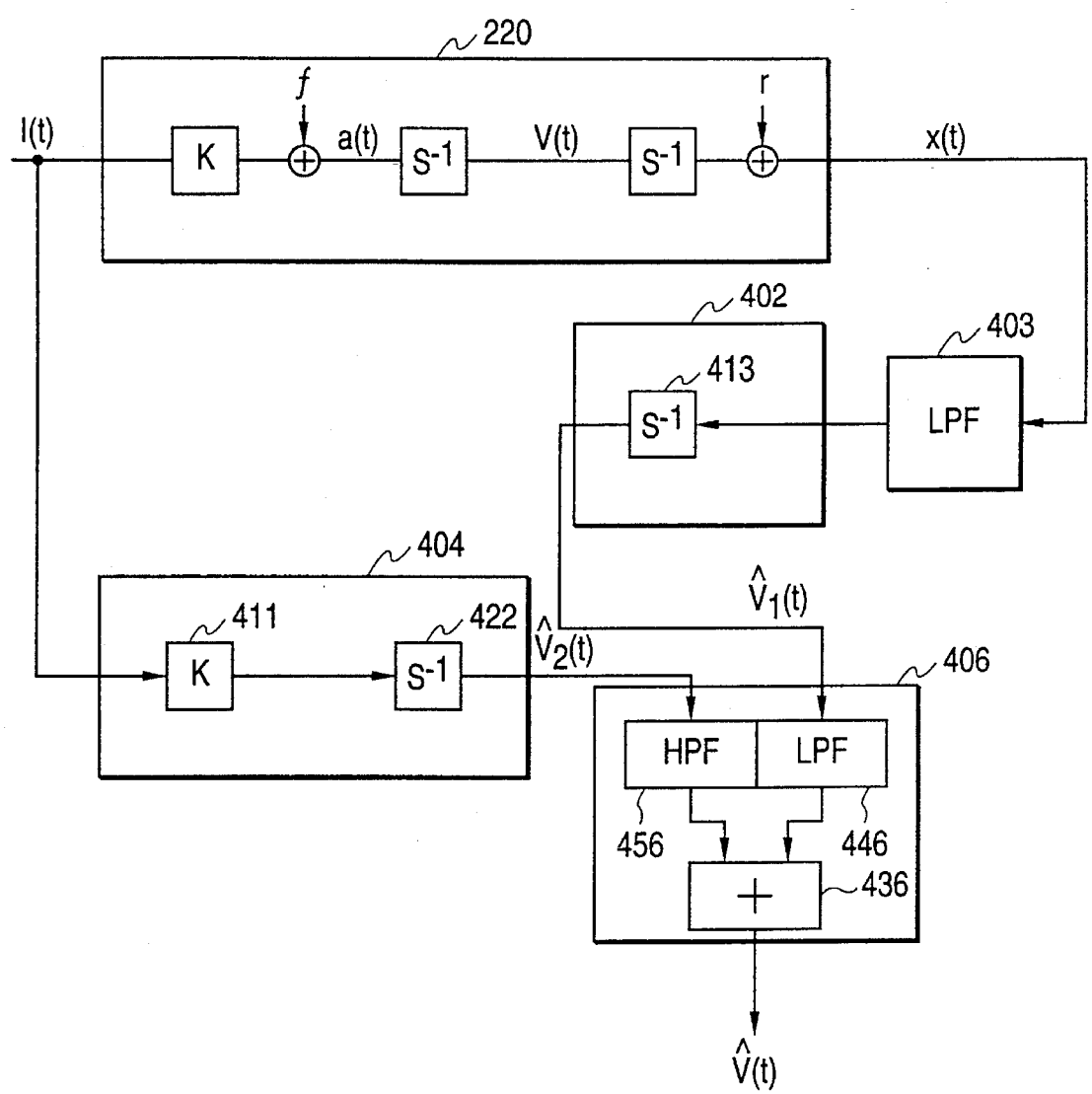
FIG. 4A is a block diagram more specifically illustrating the first preferred embodiment shown in FIG. 1.

Next will be described a case in which the preferred embodiment illustrated in FIG. 1 is used for the speed control of the magnetic disk apparatus shown in FIG. 3. The models I and II in FIG. 1 are composed in accordance with the equivalence diagram of FIG. 2. A specific example of the first preferred embodiment of FIG. 1 will be described with reference to FIG. 4A.

The plant 220, though shown in an equivalent diagram form to facilitate the readers' understanding, actually has the configuration of FIG. 3. The model 104 is materialized in the form of a block 404. The current I(t), as the control signal 112, is multiplied by the constant K and integrated in the block 404 (in a block 411 and a block 422, respectively). The output of the block 404 is a velocity $\hat{V}_2(t)$, which does not take account of the disturbance f.

Meanwhile the positional information X(t), after being partly cleared of the noise r by an LPF 403, is entered into a block 402 corresponding to the model I 105. In the block 402, it is differentiated (in a block 413) to give a velocity $\hat{V}_1(t)$.

The signals $\hat{V}_1(t)$ and $\hat{V}_2(t)$ representing velocities are entered into a block 406 corresponding to the mixer 106. The velocity $\hat{V}_1(t)$, since it is generated on the basis of the position to which the magnetic head 204 has moved in response to the actual velocity V(t), is highly reliable but contains the noise r and, in order to reduce the noise r, its high frequency component unrelated to the noise r is also reduced by the LPF 403. Meanwhile, the signal $\hat{V}_2(t)$ representing a velocity takes no account of the disturbance f. As this disturbance is generally at a low frequency, this signal $\hat{V}_2(t)$ is poor in reliability in the low frequency range. Therefore, the block 406 extracts the more reliable bands of the signals $\hat{V}_1(t)$ and $\hat{V}_2(t)$, and combine them in a mutually complementary way. Thus the high frequency component of the signal $\hat{V}_1(t)$ is reduced by an LPF 446 while the low frequency component of the signal $\hat{V}_2(t)$ is reduced by an HPF 456, and the signals so processed are added by a cumulating circuit 436 to give an estimated velocity $\hat{V}(t)$. Whereas information from the position signal X(t) eventually will have its high frequency regions cut by the two LPF's, this has an effect to increase the attenuation of the high frequency regions.

The estimated velocity $\hat{V}(t)$ thereby obtained is fed back to the controller 101, which supplies the control signal 112 (current I(t)) so as to reduce the difference between the target velocity 111 and the estimated velocity $\hat{V}(t)$ to zero.

Figure 4B:
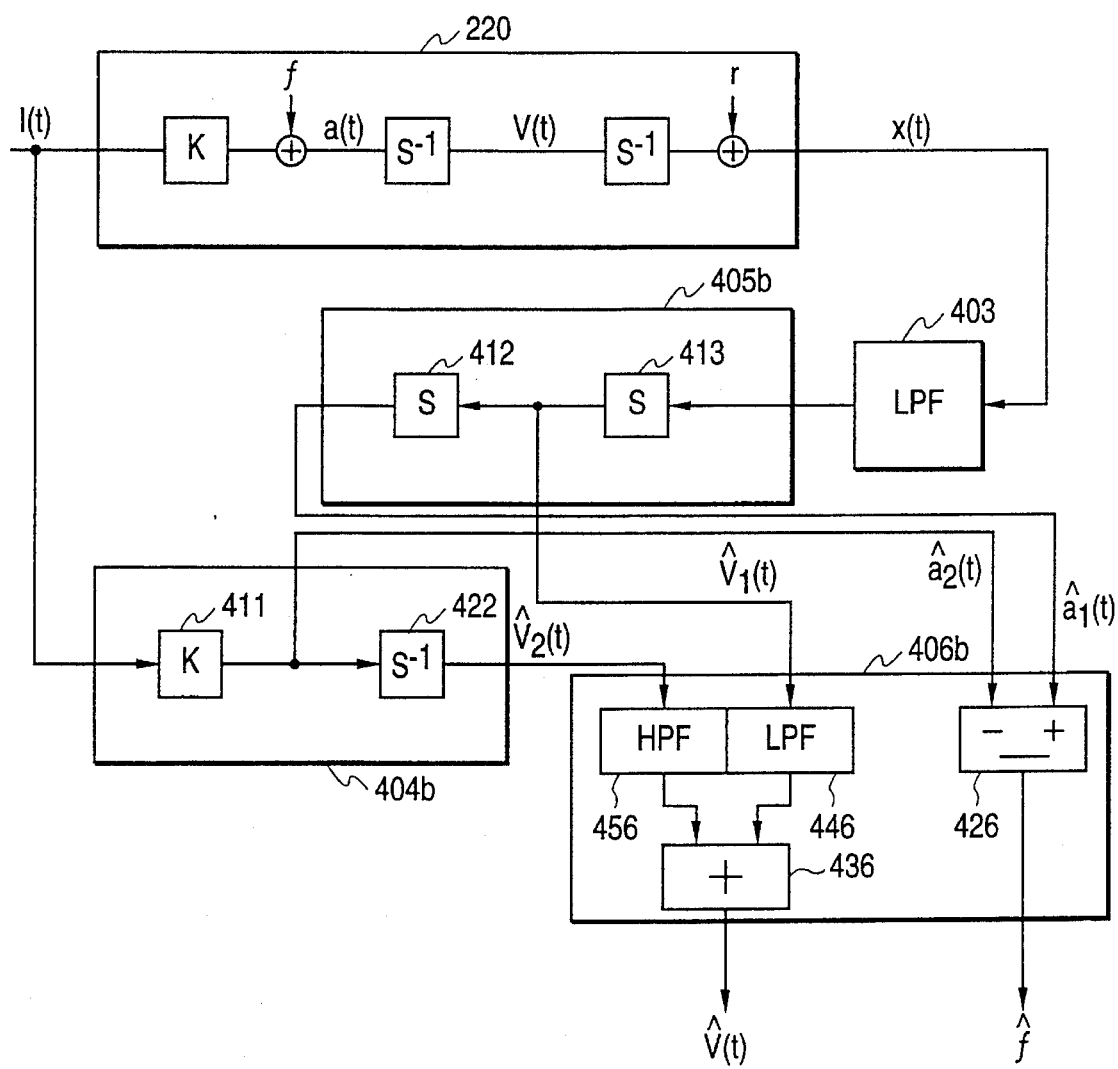
FIG. 4B is a block diagram illustrating a second preferred embodiment of the invention, which is a modified version of the specific example shown in FIG. 4A.

Next will be described a variation of this first preferred embodiment as a second preferred embodiment with reference to FIG. 4B. In this second embodiment, the disturbance f is also estimated in addition to the velocity. A model II 404b supplies an acceleration $â_2(t)$ before the addition of the disturbance f from the output terminal of the block 411. Meanwhile a model I 405b performs further differentiation (with a block 412) to supply an acceleration $â_1(t)$ which has undergone the addition of the disturbance f. These accelerations $â_1(t)$ and $â_2(t)$ are subjected to subtraction by the differential circuit 426 of a mixer 406b, and the difference is supplied as an estimated disturbance $\hat{f}$. This estimated disturbance $\hat{f}$ is entered into a controller, which supplies a current to which this disturbance component $\hat{f}$ is added. In this preferred embodiment, there are two estimated physical quantities 118.

Next will be described a third preferred embodiment of the present invention. As the part consisting of the models I and II and the mixer in the aforementioned first preferred embodiment has the same effects as a usual estimator, what corresponds to that part is composed of an estimator in this third embodiment.

Figure 5:
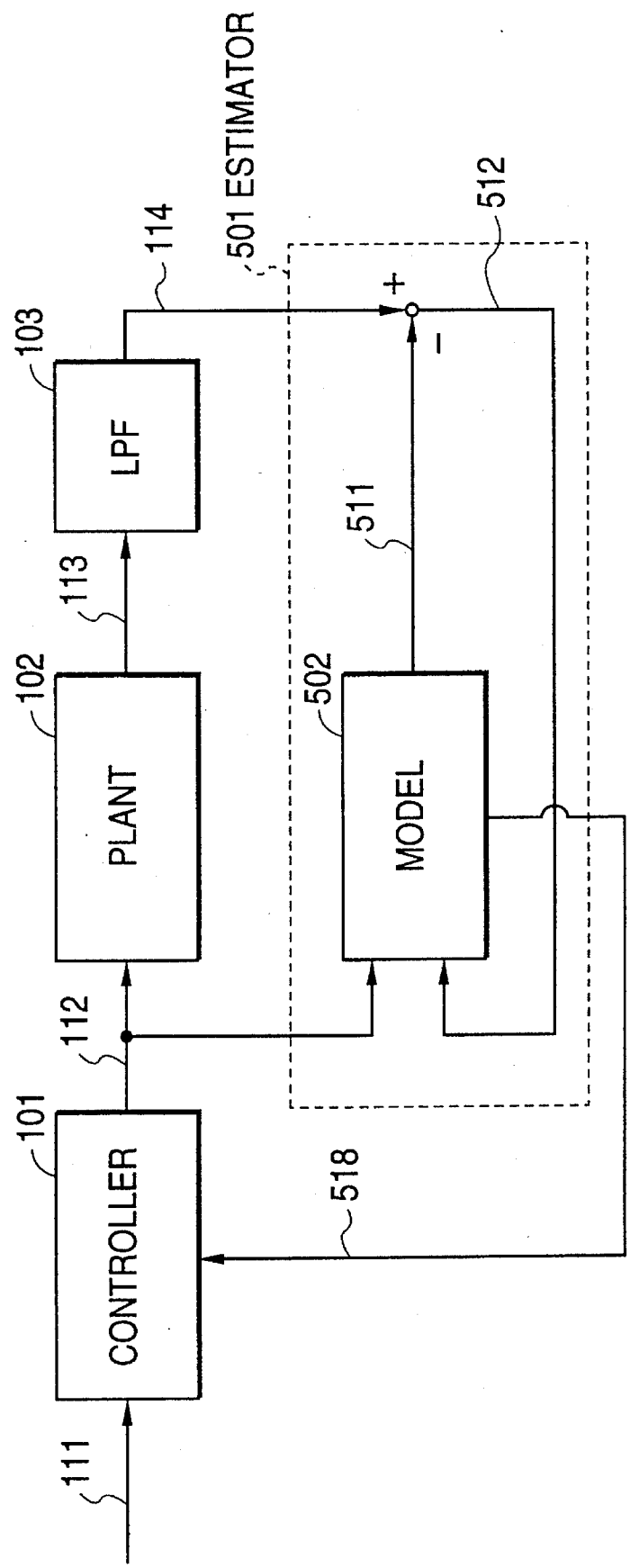
FIG. 5 is a block diagram illustrating a third preferred embodiment of the invention.

FIG. 5 is a block diagram illustrating a third preferred embodiment of the invention. In this diagram, parts which are the same as the corresponding parts in FIG. 1 cited above are assigned respectively the same reference numerals, and their description is dispensed with. An estimator 501 has a model 502 equivalent to the plant 102. The model 502, into which the control input 112 is entered, supplies an output 511 (indicating the position), and alters its internal status according to a signal 512. From the output terminal 518 of the model 502, a value corresponding to the internal physical quantity to be controlled is supplied. The estimator 501 forms a feedback loop within itself and, as it so varies the model 502 as to eliminate the difference between the output 511 of the model 502 and the output 114 of the plant supplied via the LPF 103, the internal physical quantity of the output 518 approaches the internal physical quantity of the plant 102. The model 502 is restrained from being influenced by noise because the high frequency noise component of the output 114 generated in the plant 102, with which the output 511 of the model 502 is caused to comply, is reduced by the LPF 103.

Figure 6:
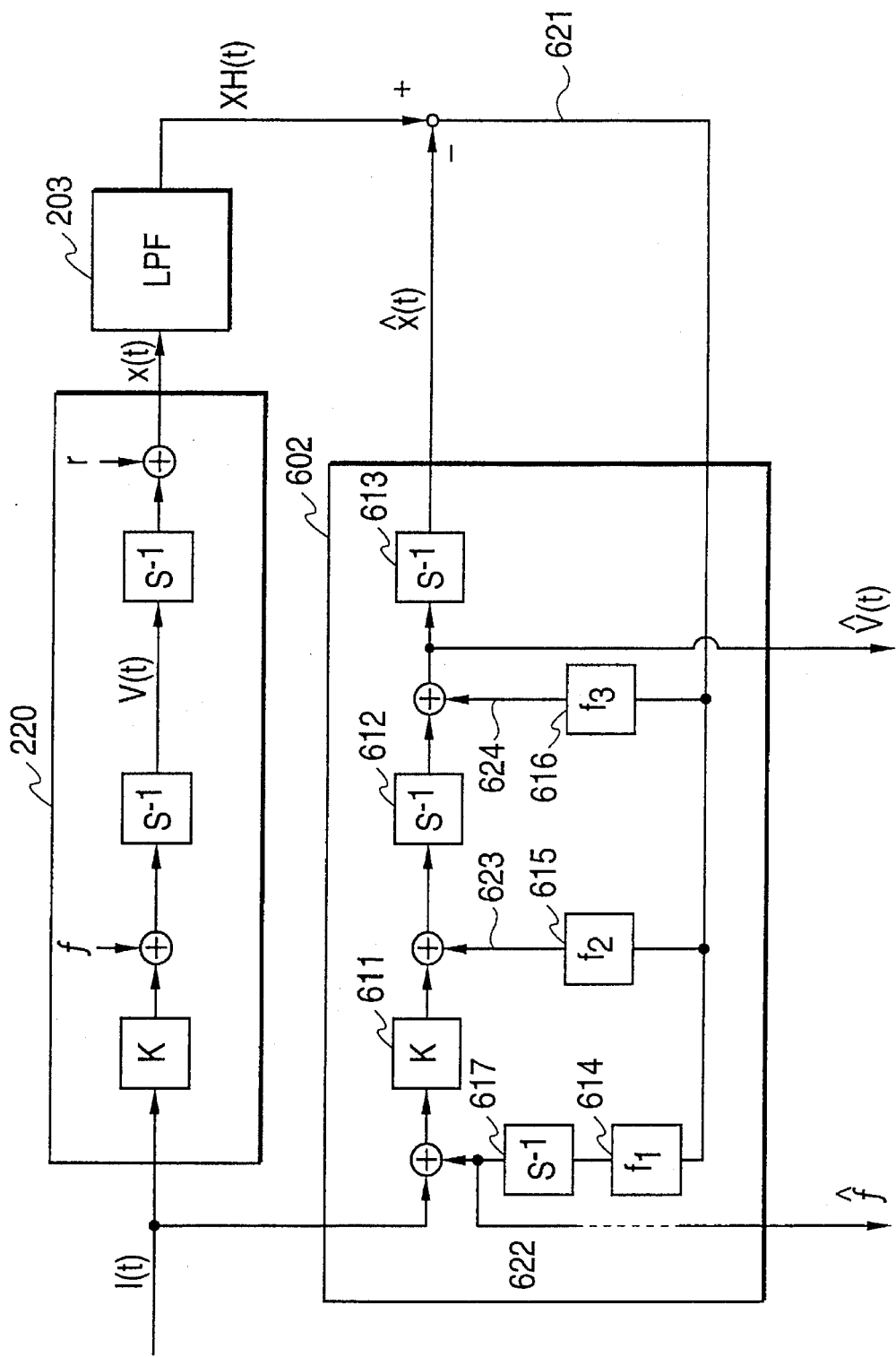
FIG. 6 is a block diagram more specifically illustrating the third preferred embodiment shown in FIG. 5.

Now will be more specifically described the third preferred embodiment with reference to FIG. 6. In this embodiment, the plant is the aforementioned magnetic disk apparatus, and the physical quantities to be fed back to the controller are the estimated velocity and the disturbance as in the above-described second preferred environment. A model 602 supplies a positional signal $\hat{X}(t)$ via blocks 611, 612 and 613 in which a current I(t) is set equivalently to a plant 220. The difference between this signal $\hat{X}(t)$ and the output XH(t) of the LPF 203 equals a signal 621. This signal 621 is entered into blocks 614, 615 and 616, and multiplied by respective constants ($f_1$, $f_2$ and $f_3$). Resultant outputs 623 and 624 are added to inputs to the aforementioned blocks 612 and 613. The output of the block 614 is integrated in a block 617, and added to an input to the block 611. Therefore, by appropriately determining the constants ($f_1$, $f_2$ and $f_3$) of the blocks 614, 615 and 616, correction can be accomplished within the model 602.

The signal received by the block 613, representing the estimated velocity $\hat{V}(t)$, and the signal 623 supplied from the block 617, representing the estimated disturbance $\hat{f}$, are supplied to the controller 101. In the controller 101, while the estimated velocity $\hat{V}(t)$ can be treated as a velocity, the estimated disturbance $\hat{f}$ has an amperage in this example. Therefore the controller 101 is required to use this $\hat{f}$ as a current for the corrective purpose. However, since the controller 101 uses the current I(t) as a control signal, its processing will be facilitated if the $\hat{f}$ to be corrected is given in amperage.

In the fifth preferred embodiment to be described below, the disturbance is treated as a current in view of this consideration.

Next will be described a fourth preferred embodiment of the present invention. The fourth embodiment illustrated in FIG. 7 has two stages of estimators to estimate one physical quantity. An estimator I 701 has a model I 703 equivalent to the plant 102, and the model I 703 receives the control signal 112 and outputs the detection signal 113. The model I 703 supplies a signal 711 corresponding to the internal physical quantity.

An estimator II 1702 has within it a model II 704 equivalent to the part of the model I 703 from the input to the physical quantity, and the model II 704 inputs the control signal 112 and outputs a signal 711 corresponding to the internal physical quantity. The output 712 of the model II 704 is fed back to the controller 101 as the estimated physical quantity 712.

Now will be described with reference to FIG. 8 a specific example in which the estimators in this fourth embodiment are arithmetic processors which digitally perform the inputting and outputting.

The control signal 112 supplied from the controller to the plant 102, besides being input to the plant 102, is input to an analog-to-digital (A/D) converter 801 and digitized. The output of the A/D converter 801 is input to an estimator I 871 and an estimator II 872 as a control signal 812. The signal 113 detected by the plant 102 is digitized by an A/D converter 802 into a digital detection signal 813. The estimator 871 arithmetically processes the control signal 812 and the detection signal 813, which are supplied it, and digitally supplies the internal physical quantity of the plant 102 (signal 811). The estimator II 872, into which the control signal 812 and the signal 811 are input, digitally supplies the internal physical quantity of the plant 102 (signal 814). This outputted signal 814 is input to a digital-to-analog (D/A) converter 803, and output as an analog signal 712. This signal 712, representing the internal physical quantity of the plant 102, is fed to the controller for use in control.

Figure 8:
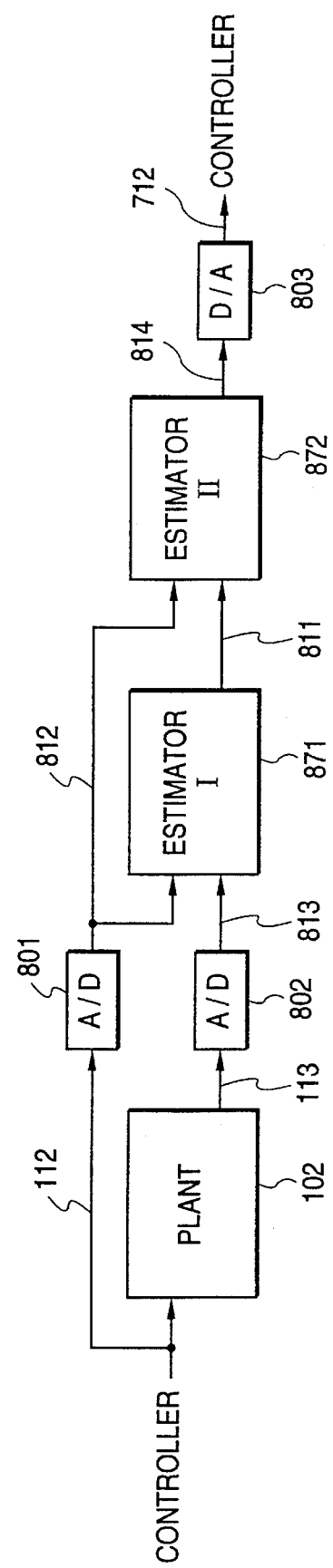
FIG. 8 is a block diagram illustrating a modified version of the fourth preferred embodiment shown in FIG. 7.

In this example of FIG. 8, since the quantities to be handled by the plant 102 are digitized by the converter in a specific sampling period, the estimators should process them as a discrete system. Next will be described an example in which the fourth preferred embodiment is realized with estimators which process a discrete system by numerical operation.

Figure 9A:
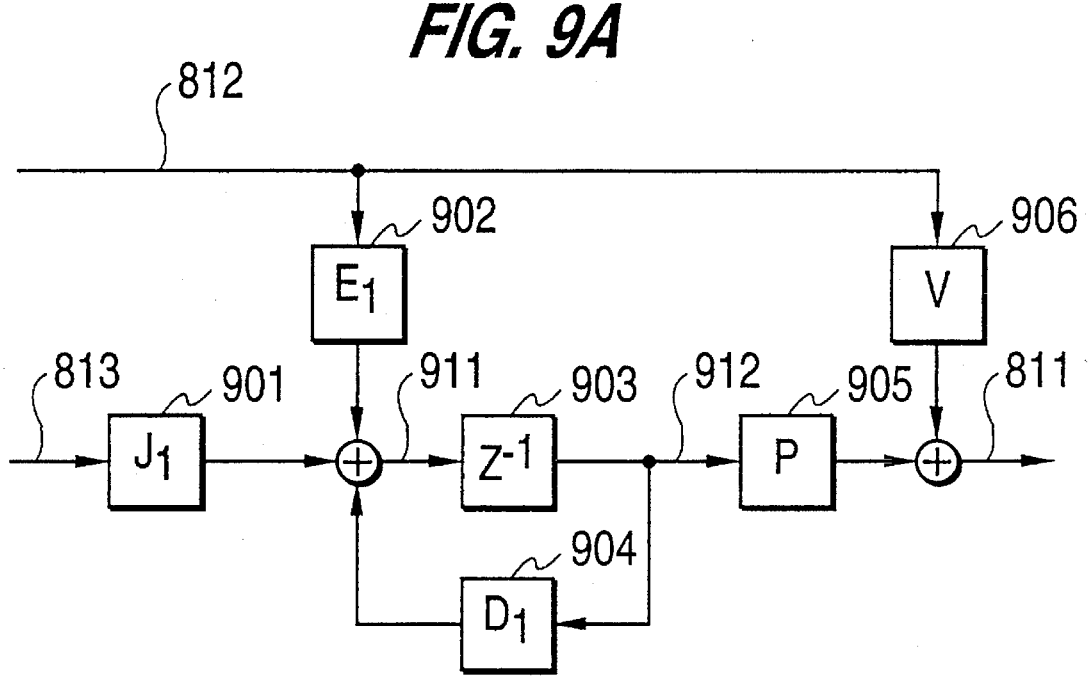
FIGS. 9A and 9B are specific block diagrams of Estimators I and II, respectively, in FIG. 8.

FIG. 9A is a specific example of the estimator I 871 of FIG. 8. The control signal 812 is supposed to be u(k); the detection signal. 813, y(k); the output signal 811, $\bar{x}(k)$; the input 911 to a delay unit 903, z(k+1), and its output 912, z(k). The value z(k+1) is the sum of the result of the linear conversion of u(k) by E1 in a block 902, that of the linear conversion of y(k) by J1 in a block 901, and that of the linear conversion of z(k) by D1 in a block 904.

$$z(k+1)=E1u(k)+J1y(k) \quad (1)$$

The value $\bar{x}(k)$ is the sum of the result of the linear conversion of u(k) by V in a block 906 and that of the linear conversion of z(k) by P in a block 905.

$$\bar{x}(k)=Pz(k)+Vu(k) \quad (2)$$

Figure 9B:
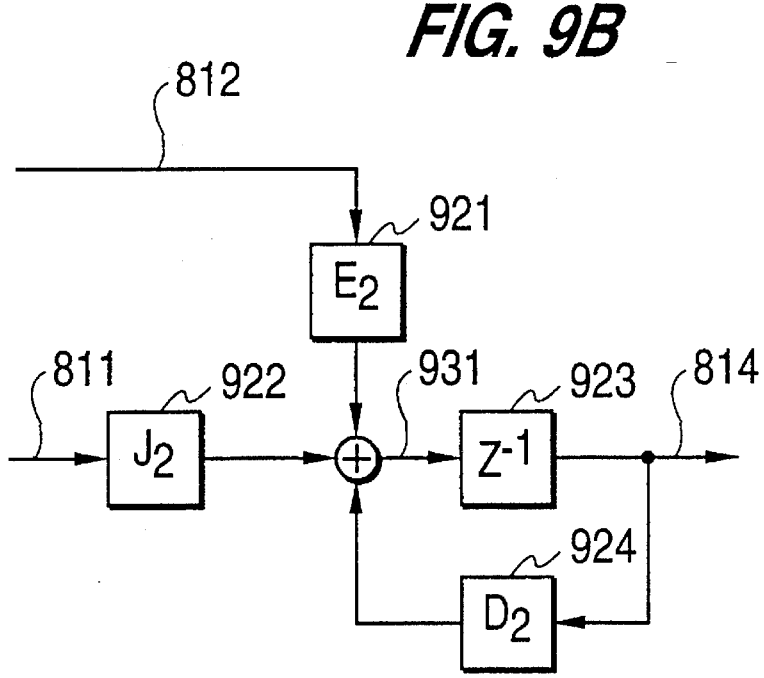

FIG. 9B illustrates a specific example of the estimator 872 of FIG. 8. The input 931 to a delay unit 923 is supposed to be x(k+1), and its output 814, x(k). The value x(k+1) is the sum of the result of the linear conversion of u(k) by E2 in a block 921, that of the linear conversion of $\bar{x}(k)$ by J2 in a block 922, and that of the linear conversion of x(k) by D2 in a block 924.

$$x(k+1)=D2x(k)+E2u(k)+J2\bar{x}(k) \quad (3)$$

In these equations (1), (2) and (3), the internal physical quantity x(k) can be obtained by setting each linear conversion to match the plant.

Figure 7:
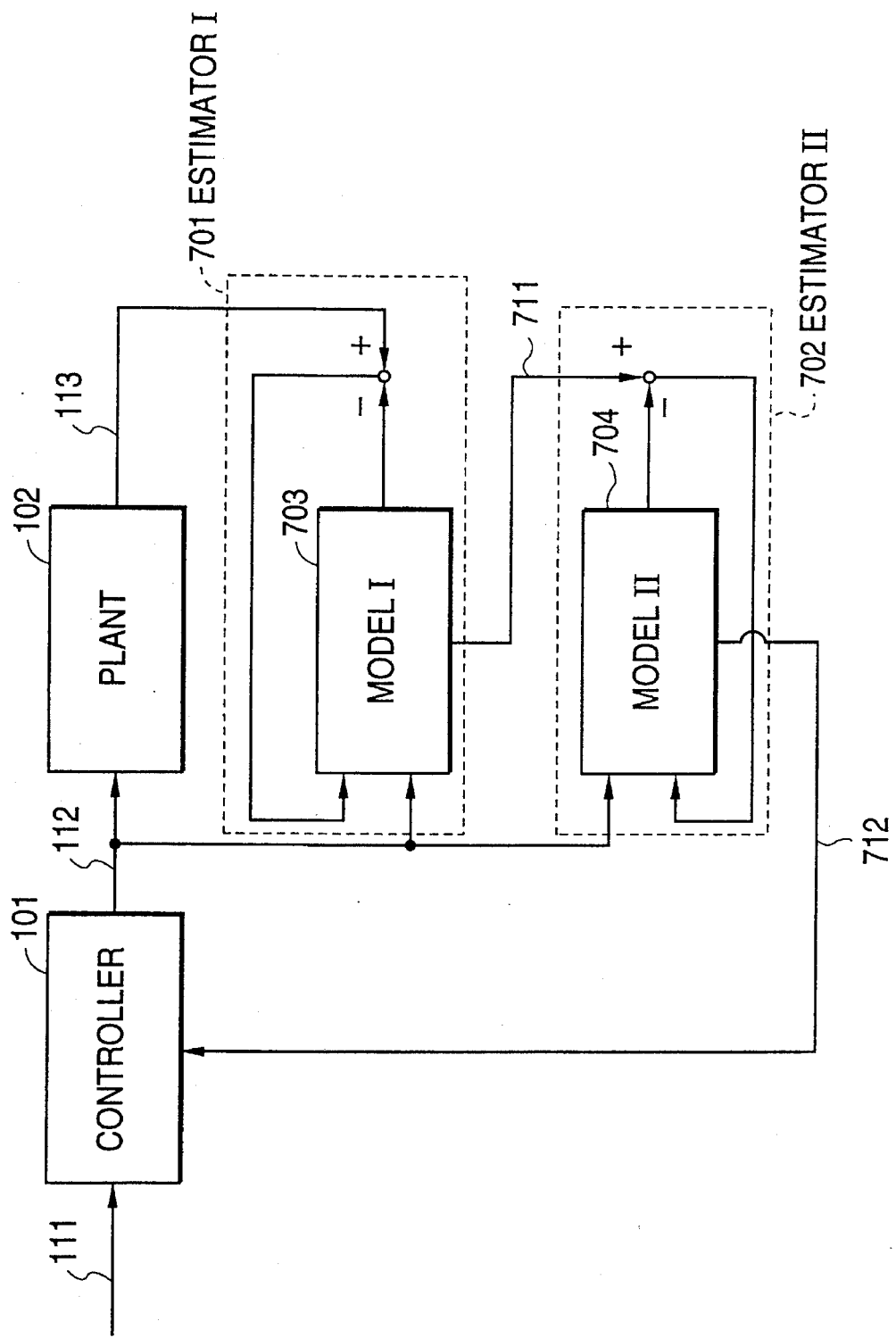
FIG. 7 is a block diagram illustrating a fourth preferred embodiment of the invention.

The embodiment of the invention described with reference to FIGS. 8, 9A and 9B is a general one. Next will be described, as a fifth preferred embodiment, an example in which the aforementioned estimators for the discrete system illustrated in FIG. 7, are used in the aforementioned magnetic disk apparatus.

Figure 10:
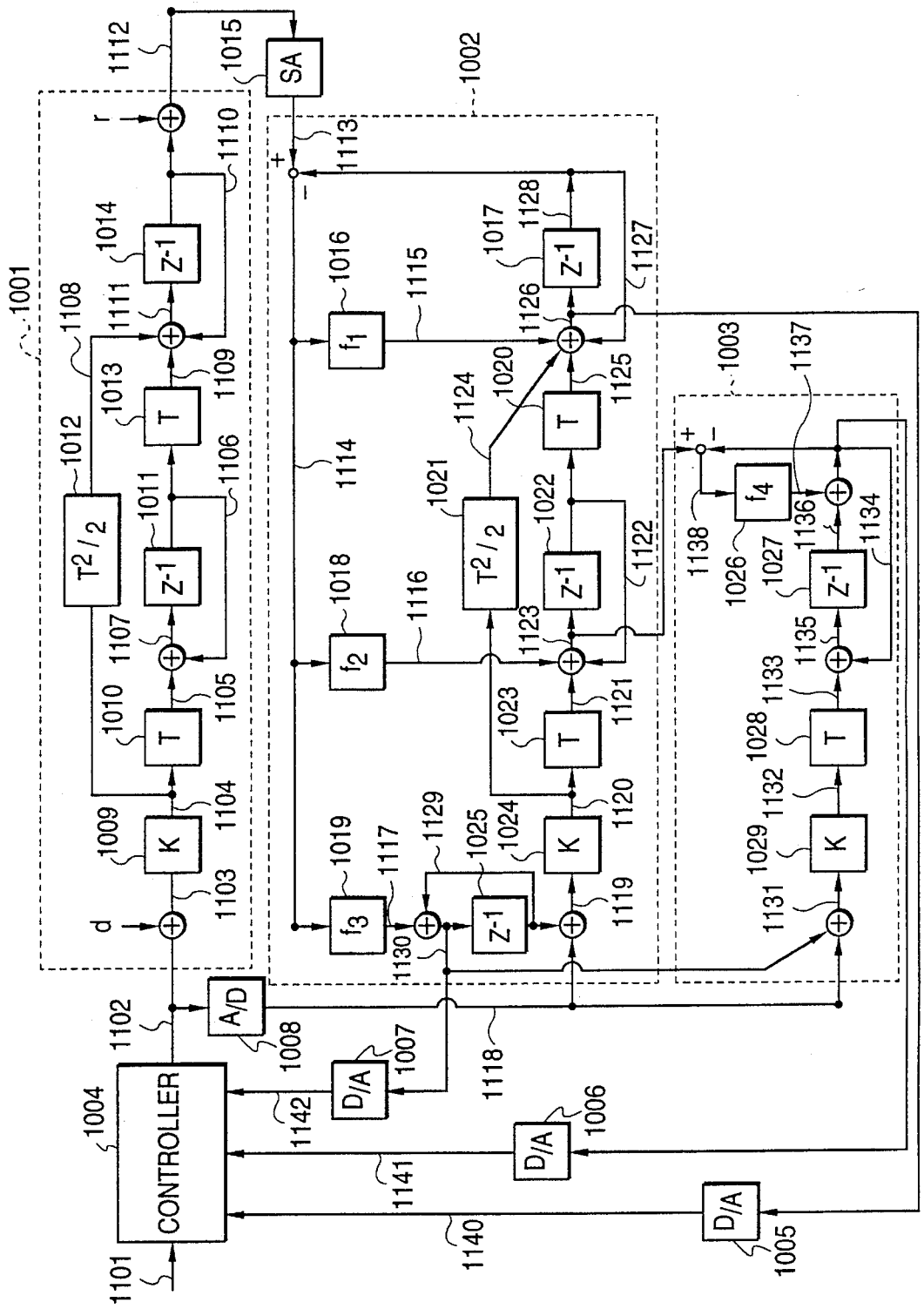
FIG. 10 is a block diagram illustrating a fifth preferred embodiment of the invention.

The fifth embodiment is illustrated in FIG. 10. A controller 1004 refers to estimated disturbance information 1142, estimated velocity information 1141 and estimated position information 1140 in order to supply a control signal 1102 corresponding to a set input 1101. All the quantities handled by the controller 1004 are analog quantities. The control signal 1102 is entered into a plant (the magnetic head drive unit shown in FIG. 3) 1001, which is described below.

The plant 1001, though it is a continuous system, will be described in detail here with reference to a discrete equivalent diagram to facilitate the readers' understanding as it is realized with a discrete system. Disturbance d is added to the control signal 1102. This disturbance, though due to the same factor as described above with reference to FIG. 2, is entered here as a current, while the disturbance was entered as an acceleration in FIG. 2. This, difference, however, does not matter here, but only needs to be considered when an estimated d is to be handled by the controller 1004. Information 1103, to which this disturbance d has been added, is multiplied in a block 1009 by a constant number K to become acceleration information 1104. The acceleration information 1104 is multiplied in a block 1010 by a sampling period T to become information 1105. This information 1105, representing the velocity variation over the sampling period T, is added to the output 1106 of a delay unit 1105 (whose delay time is T) to become information 1107, which is entered into the delay unit 1011. The part comprising these blocks 1010 and 1011 performs integration in a discrete system. Therefore, the input to and the output from the delay unit 1011 are velocity-representing pieces of information.

The integrated information is further integrated by a part consisting of blocks 1013 and 1014 to give position information 1110. Whereas information 1108 obtained by multiplying the acceleration by $T^2/2$ is added here in block 1012 as a position, this is because a plurality of sampled values are needed to obtain the position from the acceleration via the velocity, and the delay is provided for that purpose. Therefore, extra time is taken to obtain the position from the acceleration, and this is hardly equivalent in an actual apparatus. Accordingly, the positional variation is calculated from the current acceleration and added.

Noise r is added to the position information 1110, which is detected as detection information 1112. The estimators are composed correspondingly to the equivalent circuits described above.

In this embodiment, three physical quantities are estimated by the estimators as stated above. A first estimator 1002, having an equivalent configuration to the plant 1001, estimates and supplies all these physical quantities. The estimator 1002 is supplied with control information 1118, resulting from the digitization of the control signal 1102 by an A/D converter 1008 in a sampling period T. Information 1129, corresponding to the disturbance d, is added to this information 1118 to give information 1119. This information 1119 is subjected to processing corresponding to the equivalent circuits of the aforementioned plant 1001. It first becomes acceleration information 1120 in a block 1024, and velocity information 1123 and 1122 in blocks 1023 and 1022, respectively. These pieces of velocity information contain compensation information 1116 added to them. Then, the velocity information 1122 becomes position information 1126 and 1128 in blocks 1020, 1021 and 1017. These pieces of position information contain compensation information 1115 added to them.

The disturbance d and the compensation information 1115 and 1116 are generated from information resulting from the sampling of the detection signal 1112 of the plant 1001 by a sampler 1015 in a period T. It is supposed that, in this preferred embodiment, the position is detected in a digital value by the magnetic head as an address written on a medium. The position information 1128 obtained by the estimator 1002 is compared with position information 1113 detected by the plant 1001 to give difference information 1114. This difference information 1114 is multiplied by f1 in a block 1016 to generate the compensation information 1115, and multiplied by f2 in a block 1018 to give the compensation information 1116. The difference information 1114 is multiplied by f3 in a block 1019 to generate disturbance information 1117, and the output 1129 of a delay unit 1025 is added to this information 1117 to generate estimated disturbance 1130. The output of the delay unit 1025 is added to the control information 1129 as information 1129 corresponding to disturbance.

This estimated disturbance 1130 is fed by a D/A converter 1007 to the controller 1004 as an analog estimated disturbance signal 1142. The position information 1126 obtained by the estimator 1002 is fed back by a D/A converter 1005 to the controller 1104 as an analog estimated position signal 1140. The velocity information 1123 is entered into the next estimator 1003.

The estimator J.003 is composed equivalently to the part of the estimator 1002 from the control information input to the velocity information. The estimator 1003 adds the control information 1118 and the disturbance 1130, which are entered into it, to give information 1131. The information 1131 is converted in a block 1029 into acceleration information 1132, and into velocity information 1135 and 1136 in blocks 1028 and 1027, respectively. Compensation information 1137 is added to the velocity information 1136 to give estimated velocity information 1134.

The velocity information 1123 output from the aforementioned estimator 1002 is compared with this estimated velocity information 1134, and the difference 1138 between them is multiplied by f4 in a block 1026 to generate compensation information 1137. The estimated velocity information 1134 is placed in analog format by a D/A converter 1006, and fed back to the controller 1004 as an estimated velocity signal 1141.

Various preferred embodiments of the present invention have been described so far. Though differing in form, these embodiments are identical in that they are all intended to prevent the high frequency noise, which comes into the detection of physical quantities within the plant, from affecting the estimation of the physical quantities.

Figure 11A:
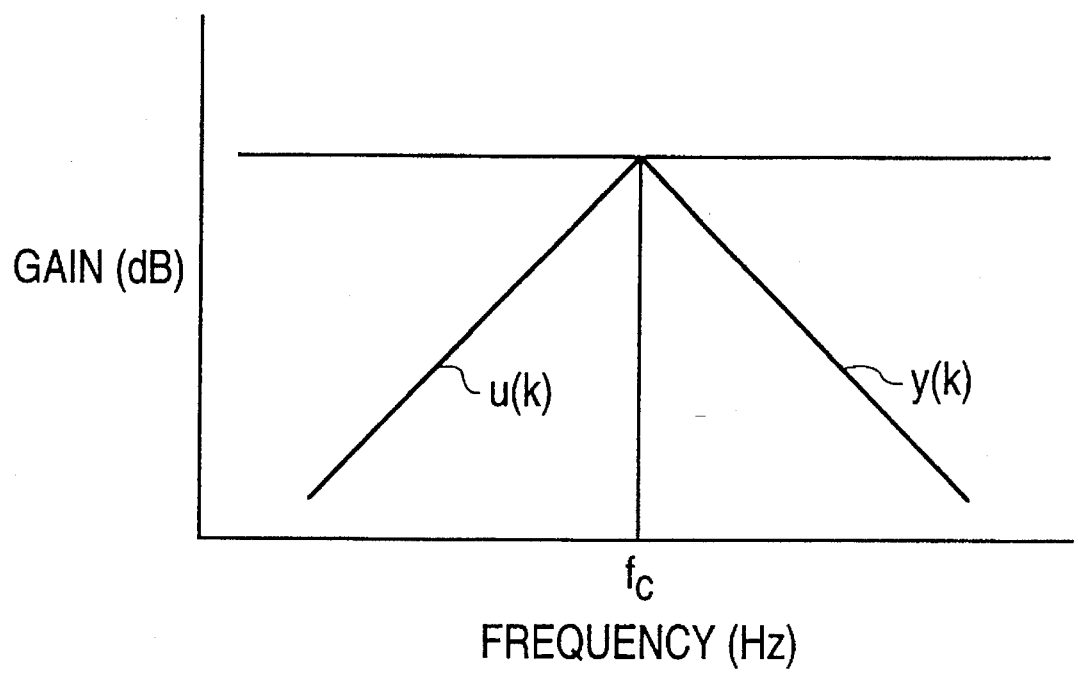
FIGS. 11A and 11B are board diagrams showing the characteristics of the fourth preferred embodiment.

The benefit of the invention will now be explained with reference to the fourth embodiment illustrated in FIGS. 8, 9A and 9B, which is described in the most general terms. The frequency characteristic of the estimator of FIG. 9A, represented by the above cited state equations (1) and (2), can be illustrated by the Bode diagram of FIG. 11A. Thus, in the frequency range below fc, y(k) is dominant, and the influence of u(k) diminishes as the frequency becomes lower. In the frequency range above fc, u(k) is dominant, and the influence of y(k) decreases as the frequency becomes higher.

Figure 11B:
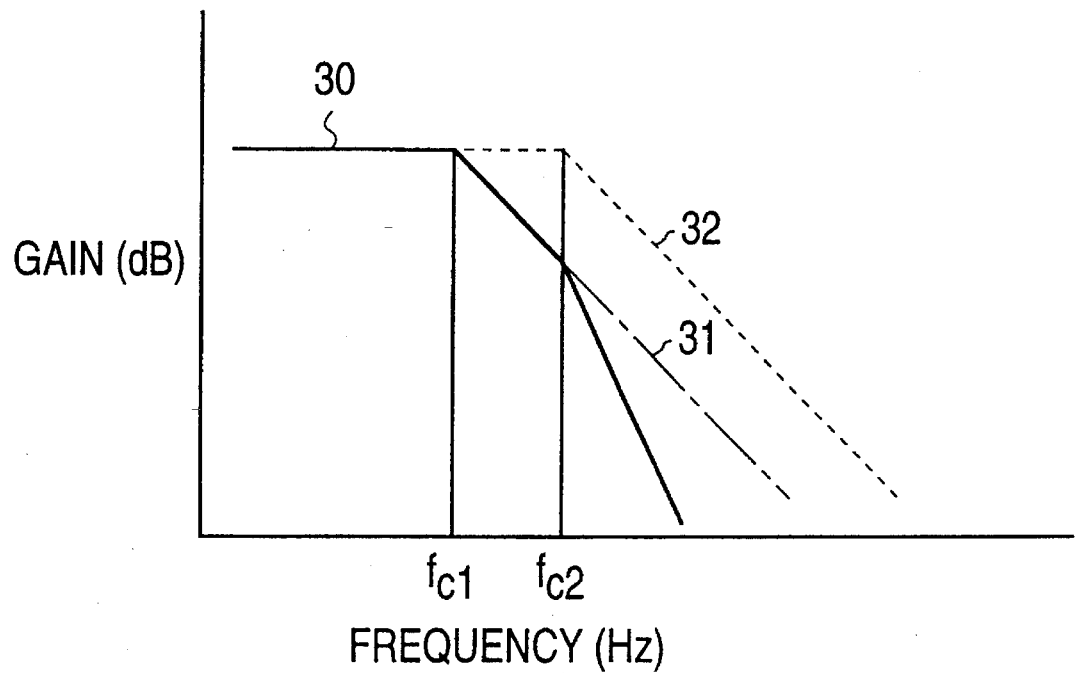

If, in addition to this estimator, the estimator of FIG. 9B is provided at its output, u(k) will remain unchanged, and y(k) will be as represented by the solid line 30 in FIG. 11B. In this diagram, the chain line 31 represents the frequency characteristic of the estimator shown in FIG. 9A with respect to y(k) and the broken line 32, that of the estimator itself, shown in FIG. 9B, with respect to x̄(k). Therefore, fc1 and fc2 are the mixed frequencies of these estimators, which are determined by the aforementioned linear conversions.

Thus, the two-stage estimator configuration has resulted in a greater reduction rate of the detection signal of the plant in the high frequency region, making it possible to diminish the influence of high frequency noise in the estimated physical quantities.

In the first and third preferred embodiments, noise is reduced by merely providing an LPF for the detection signal output. These embodiments, though having an effect to restrain the influence of noise, merely reduces its high frequency region, and accordingly it is superior in precision, as in the fourth and fifth embodiments, to compensate for the decrement of the detection signal on the part of the control signal.

Further, whereas the fourth and fifth embodiments have two-stage estimator configurations, three or more stages of estimators could increase the reduction rate even more.

What is claimed is:

1. An estimator for estimating a velocity of an object, comprising:
   a plant for driving said object, said plant receiving a control signal, moving said object in response to said control signal, and outputting a detection signal representing a position of said object;
   a controller for producing said control signal;
   a first estimator for generating a first velocity signal which represents a velocity of said object by estimating the velocity of said object on the basis of said control signal;
   a first filter for generating a low frequency detection signal by cutting off high frequency region of said detection signal;
   a second estimator for generating a second velocity signal which represents the velocity of said object by estimating the velocity of said object on the basis of said low frequency detection signal; and
   a mixer for generating a velocity signal which represents the velocity of said object;
   wherein said mixer includes:
      a second filter for reducing low frequency components of said first velocity signal;
      a third filter for reducing high frequency components of said second velocity signal; and
      a cumulating means for adding the output of said second filter and the output of said third filter and outputting said velocity signal.

2. An estimator, as claimed in claim 1, wherein:
   said control signal indicates an acceleration of said object;
   said first estimator comprises an integrating means for integrating said control signal; and
   said second estimator comprises a first differentiating means for differentiating said low frequency detection signal.

3. An estimator, as claimed in claim 2, further comprising:
   a second differentiating means for generating an acceleration signal by differentiating the output of said first differentiating means; and
   a differential means for supplying a difference between the acceleration of said object represented by said control signal and the acceleration of said object represented by said acceleration signal and outputting said difference as an estimated value of disturbance supplied to said plant.

4. An estimator, as claimed in claim 1, wherein:
   said object is a magnetic head for reading information on a disk; and
   said plant comprises:
      a coil for moving said magnetic head according to said control signal; and
      a converter for generating said detection signal by converting information obtained by said magnetic head.

5. An estimator for estimating a velocity of an object, comprising:
   a plant for driving said object, said plant receiving a control signal, moving said object in response to said control signal, and outputting a detection signal representing a position of said object;
   a controller for producing said control signal;
   a first filter for generating a low frequency detection signal by cutting off a high frequency region of said detection signal;
   an estimating means for estimating the velocity and the position of said object on the basis of said control signal and a difference signal;
   a subtracting means for generating said difference signal indicating the difference between the position of said object represented by said low frequency detection signal and the position of said object estimated by said estimating means;
   a differentiating means for generating a signal representing disturbance by differentiating said difference signal;
   a first integrating means for generating an estimated velocity signal which represents the estimated velocity of said object by integrating said control signal; and
   a second integrating means for generating a signal which represents the estimated position of said object by integrating said estimated velocity signal.

6. An estimator for estimating a first physical quantity indicating an internal status in a plant, wherein said plant, upon receiving a control signal from a controller, outputs a detection signal which represents a second physical quantity indicating an internal status in said plant, comprising:
   a first estimator for generating a first estimated signal, which is an estimated signal of said first physical quantity, on the basis of said control signal and said detection signal, a frequency characteristic of said first estimator being such that the influence of said detection signal decreases as the frequency becomes higher; and
   a second estimator for generating a second estimated signal, which is an estimated signal of said first physical quantity which represents said internal status in said plant, on the basis of said control signal and said first estimated signal.

7. An estimator, as claimed in claim 6, wherein:
   said first estimator further estimates said second physical quantity; and
   said first estimator tunes itself to eliminate a difference between said second physical quantity estimated thereby and said second physical quantity represented by said detection signal.

8. An estimator, as claimed in claim 6, wherein:
   said second estimator tunes itself to eliminate a difference between said second physical quantity estimated thereby and said second physical quantity estimated by said first estimator.

9. An estimator, as claimed in claim 6, wherein:
   said plant comprises an object;
   said first physical quantity corresponds to a velocity of said object; and said second physical quantity corresponds to a position of said object.

10. An estimator, as claimed in claim 9, wherein:

said object is a magnetic head for reading information on a disk; and said plant further comprises a coil for moving said magnetic head according to said control signal, and a converter for generating said detection signal by converting information obtained by said magnetic head.

* * * * *